(12) United States Patent
Brandt

(10) Patent No.: US 11,085,349 B2
(45) Date of Patent: Aug. 10, 2021

(54) MONITORING A PRESSURE SENSOR IN A HYDRAULIC SYSTEM OF A MOTOR VEHICLE

(71) Applicant: CPT Group GmbH, Hannover (DE)

(72) Inventor: Martin Brandt, Wörth a.d. Donau (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 46 days.

(21) Appl. No.: 16/338,007

(22) PCT Filed: Sep. 18, 2017

(86) PCT No.: PCT/EP2017/073463
§ 371 (c)(1),
(2) Date: Mar. 29, 2019

(87) PCT Pub. No.: WO2018/065199
PCT Pub. Date: Apr. 12, 2018

(65) Prior Publication Data
US 2019/0234282 A1    Aug. 1, 2019

(30) Foreign Application Priority Data

Oct. 7, 2016   (DE) .................... 10 2016 219 536.0

(51) Int. Cl.
*F01N 11/00*   (2006.01)
*F01N 3/20*    (2006.01)
(Continued)

(52) U.S. Cl.
CPC ............ *F01N 11/002* (2013.01); *F01N 3/208* (2013.01); *F01N 3/2066* (2013.01);
(Continued)

(58) Field of Classification Search
CPC .. F01N 11/002; F01N 11/005; F01N 2250/00; F01N 2550/05; F01N 2560/08;
(Continued)

(56) References Cited

U.S. PATENT DOCUMENTS

| 5,767,389 A | 6/1998 | LaFountain ...................... 73/39 |
| 6,234,148 B1 * | 5/2001 | Hartke .................. F02D 41/222 123/198 D |

(Continued)

FOREIGN PATENT DOCUMENTS

| CN | 101218420 A | 7/2008 | .............. F01N 11/00 |
| CN | 102052133 A | 5/2011 | .............. F01N 11/00 |

(Continued)

OTHER PUBLICATIONS

English Machine Translation JP 200214916 (Year: 2000).*

(Continued)

*Primary Examiner* — Anthony Ayala Delgado
(74) *Attorney, Agent, or Firm* — Slayden Grubert Beard PLLC

(57) ABSTRACT

Various embodiments include a method for monitoring a pressure sensor in a hydraulic system of a motor vehicle, the method comprising: actuating a valve of a pressure accumulator in the hydraulic system; detecting a behavior of the actuated valve in response to the actuation; determining a time offset of the actuated valve based on the detected behaviour; determining a measurement value of the pressure sensor; comparing the time offset of the valve with the determined measurement value; and checking a plausibility of the measurement value based on the comparison.

13 Claims, 8 Drawing Sheets

(51) Int. Cl.
  *G01L 13/00* (2006.01)
  *G01L 27/00* (2006.01)

(52) U.S. Cl.
  CPC ............ *F01N 11/005* (2013.01); *G01L 13/00* (2013.01); *G01L 27/007* (2013.01); *F01N 2250/00* (2013.01); *F01N 2550/05* (2013.01); *F01N 2560/08* (2013.01); *F01N 2610/14* (2013.01); *F01N 2900/1808* (2013.01); *Y02A 50/20* (2018.01); *Y02T 10/12* (2013.01); *Y02T 10/40* (2013.01)

(58) Field of Classification Search
  CPC ......... F01N 2610/14; F01N 2900/1808; F01N 3/2066; F01N 3/208; G01L 13/00; G01L 27/007
  See application file for complete search history.

(56) References Cited

U.S. PATENT DOCUMENTS

| | | | |
|---|---|---|---|
| 8,156,728 B2 | 4/2012 | Hinz et al. | 60/277 |
| 8,522,530 B2 | 9/2013 | Igarashi et al. | 60/277 |
| 9,617,885 B2 * | 4/2017 | Dyrbusch | F01N 11/00 |
| 9,816,418 B2 | 11/2017 | Hodgson et al. | |
| 2010/0082224 A1 * | 4/2010 | Stretch | F02D 41/221 |
| | | | 701/103 |
| 2011/0107742 A1 * | 5/2011 | Igarashi | F01N 3/208 |
| | | | 60/277 |
| 2012/0185147 A1 | 7/2012 | Beer | 701/102 |
| 2013/0186470 A1 | 7/2013 | Offenhuber et al. | 137/1 |
| 2013/0213014 A1 * | 8/2013 | Ohno | F01N 11/00 |
| | | | 60/277 |
| 2014/0053535 A1 | 2/2014 | Dyrbusch et al. | 60/274 |
| 2016/0033351 A1 | 2/2016 | Ban et al. | 73/1.57 |
| 2018/0100470 A1 * | 4/2018 | Ooiwa | F02M 25/0836 |
| 2018/0253111 A1 * | 9/2018 | Goto | G01F 25/0007 |
| 2019/0226375 A1 * | 7/2019 | Paielli | F01N 9/00 |
| 2019/0234282 A1 * | 8/2019 | Brandt | F01N 3/208 |

FOREIGN PATENT DOCUMENTS

| | | | | |
|---|---|---|---|---|
| CN | 105408595 A | | 3/2016 | ............... F01N 3/20 |
| DE | 696 19 957 T2 | | 7/2003 | |
| DE | 10 2004 061 247 A1 | | 6/2006 | |
| DE | 10 2009 043 124 B4 | | 6/2011 | |
| DE | 10 2011 088 701 A1 | | 6/2013 | |
| DE | 10 2011 088 704 A1 | | 6/2013 | |
| DE | 10 2012 200 917 A1 | | 7/2013 | |
| DE | 10 2012 214 369 A1 | | 2/2014 | |
| DE | 10 2012 215 024 A1 | | 2/2014 | |
| DE | 10 2014 210 877 A1 | | 12/2015 | |
| DE | 10 2014 211 001 A1 | | 12/2015 | |
| DE | 10 2014 225 832 A1 | | 2/2016 | |
| DE | 10 2015 204 545 A1 | | 9/2016 | |
| FR | 3 021 997 A1 | | 12/2015 | |
| JP | 2000214916 A | * | 8/2000 | ........... G05D 7/0635 |
| WO | 2015/185480 A1 | | 12/2015 | |
| WO | 2018/065199 A1 | | 4/2018 | |

OTHER PUBLICATIONS

German Office Action, Application No. 10 2016 219 536.0, 8 pages, dated Apr. 7, 2017.
International Search Report and Written Opinion, Application No. PCT/EP2017/073463, 13 pages, dated Nov. 16, 2017.
Chinese Office Action, Application No. 201780062037.9, 12 pages, dated Jul. 24, 2020.

* cited by examiner

MONITORING A PRESSURE SENSOR IN A HYDRAULIC SYSTEM OF A MOTOR VEHICLE

CROSS-REFERENCE TO RELATED APPLICATIONS

This application is a U.S. National Stage Application of International Application No. PCT/EP2017/073463 filed Sep. 18, 2017, which designates the United States of America, and claims priority to DE Application No. 10 2016 219 536.0 filed Oct. 7, 2016, the contents of which are hereby incorporated by reference in their entirety.

TECHNICAL FIELD

The present disclosure is related to motor vehicles. Various embodiments of the teachings herein include methods and devices for monitoring a pressure sensor in a hydraulic system of a motor vehicle.

BACKGROUND

Typical vehicles with an internal combustion engine include a SCR system for performing a selective catalytic reduction, for exhaust gas aftertreatment in the exhaust system of a motor vehicle with internal combustion engine. The injection of additive in the form of a watery solution of urea upstream of a catalyst triggers a chemical reaction which reduces the nitrogen in the exhaust gas from the internal combustion engine. To ensure the correct function of the SCR system, a faulty component of the system in the driving cycle must be detected and identified sufficiently quickly. Current legislation requires monitoring the system components relevant to the exhaust gas during system operation. Both manipulation of the components and malfunction must be detected.

DE 10 2014 210 877 A1 discloses a method for monitoring the function of an injection system for injecting a liquid medium into the exhaust system of an internal combustion engine, wherein a deviation of a delivery volume per time unit can be established.

SUMMARY

The teachings of the present disclosure describe the monitoring of an SCR system, and provide an effective possibility for checking the plausibility of a pressure sensor in an SCR system. For example, some embodiments include a method for monitoring a pressure sensor (111) in a hydraulic system (103) of a motor vehicle, with the steps: a) actuation (S601, S702) of a valve (108) of a pressure accumulator (107) in the hydraulic system (103), b) determination (S602, S703) of a behavior of the actuated valve (108) in response to the actuation, c) determination (S603, S704) of a time offset (dt) of the actuated valve (108) from the determined behavior, d) determination (S604, S708) of a measurement value ($P_L$) of the pressure sensor (111), e) comparison (S605, S812) of the time offset (dt) of the valve (108) with the determined measurement value ($P_L$), and f) plausibility checking (S606, S813) of the measurement value ($P_L$) using the comparison.

In some embodiments, the determination (S602) of the behavior comprises determination of a temporal development of an electrical parameter of the valve (108), and the time offset (dt) is determined from the determined temporal development.

In some embodiments, the actuation (S601) comprises the output of an actuation signal ($S_{act}$) for opening the valve (108), and the determined time offset (dt) relates to the temporal difference between a start of an opening movement of the valve (108) and a start of the actuation.

In some embodiments, the valve (108) is configured as a solenoid valve, and the actuation leads to a movement of a solenoid armature (201) of the valve (108), wherein a temporal development of a current ($I_{coil}$) flowing through an exciter coil (202) of the valve (108) is used to determine the time offset (dt).

In some embodiments, in step a), the valve (108) is actuated for a predefined duration ($T_i$).

In some embodiments, the method furthermore comprises: performance (S705) of a pressure balance between the pressure accumulator (107) and an environment of the hydraulic system (103), and output (S707) of an error if the time offset (dt), in particular after performance of the pressure balance, is greater than a first predefined threshold (th1) or is not measurable.

In some embodiments, the method furthermore comprises: determination (S709) of a pressure difference (dP) based on the determined measurement value ($P_L$) of the pressure sensor (111) and a measurement value ($P_U$) of an ambient pressure sensor (115), wherein the ambient pressure sensor (115) is connected to a central control unit (114) of the vehicle, and adaptation (S713) or plausibility checking of an offset (b) of the valve (108) using the determined pressure difference (dP) if the pressure difference (dP) does not exceed a second predefined pressure threshold (th2), otherwise output of an error (S712).

In some embodiments, the method furthermore comprises: filling the pressure accumulator (107) by actuating the hydraulic system (103) in several predefined actuation sessions, wherein in each actuation session, a predefined fluid quantity is introduced into the pressure accumulator (107) and the steps a) to d) are performed for each of the actuation sessions.

In some embodiments, the method furthermore comprises: plausibility checking (S813) of a development of the measurement values of the pressure sensor (111) using the associated time offsets (dt) of the actuated valve (108) determined in the actuation sessions.

In some embodiments, the method furthermore comprises: determination (S806) of a pressure gradient ($gradP_L$) in an actuation session from a respective present measurement value ($P_L(2)$) and a previous measurement value ($P_L(1)$) of the pressure sensor (111).

In some embodiments, the method furthermore comprises: monitoring of the system pressure ($P_L$) from the measurement values ($P_L(1),P_L(2)$) of the pressure sensor (111) determined in the actuation sessions, ending the filling of the pressure accumulator (107) if the pressure in the pressure accumulator (107) exceeds a third predefined pressure threshold value (th3) and the pressure gradient exceeds a fourth predefined threshold (th4), and output (S810) of an error if a predefined number of actuation sessions or pump strokes for filling the pressure accumulator (107) is exceeded.

As another example, some embodiments include a device for monitoring a pressure sensor (111) in a hydraulic system (103) of a motor vehicle, comprising: a valve (108), a pressure accumulator (107) to which the pressure sensor (111) and the valve (108) are connected and which can be loaded with a system pressure, and a control unit which is connected to the pressure sensor (111) and to the valve (108) and is configured to determine a behavior of the valve (108)

which is dependent on the momentary system pressure, and from the determined behavior, to determine a time offset of the valve (108) for plausibility checking of an associated measurement value of the pressure sensor (111) using a comparison of the determined time offset and the measurement value.

In some embodiments, the hydraulic system (103) is part of an SCR system (100) for introducing urea into the exhaust system of an internal combustion engine, or comprises an SCR system (100), and wherein the valve (108) is an injector of the SCR system which is configured as a solenoid valve.

As another example, some embodiments include a motor vehicle with an internal combustion engine and an SCR system (100) for introducing urea into the exhaust system of the internal combustion engine, wherein the SCR system (100) comprises a pressure accumulator (107) for the additive and connected thereto a pressure sensor (111) and an injection valve (108), and furthermore is provided with a control unit which is connected to the SCR system (100) and configured such that the method as described above.

BRIEF DESCRIPTION OF THE DRAWINGS

The teachings herein reference example embodiments in relation to the appended figures. The drawings show.

Figure 1:
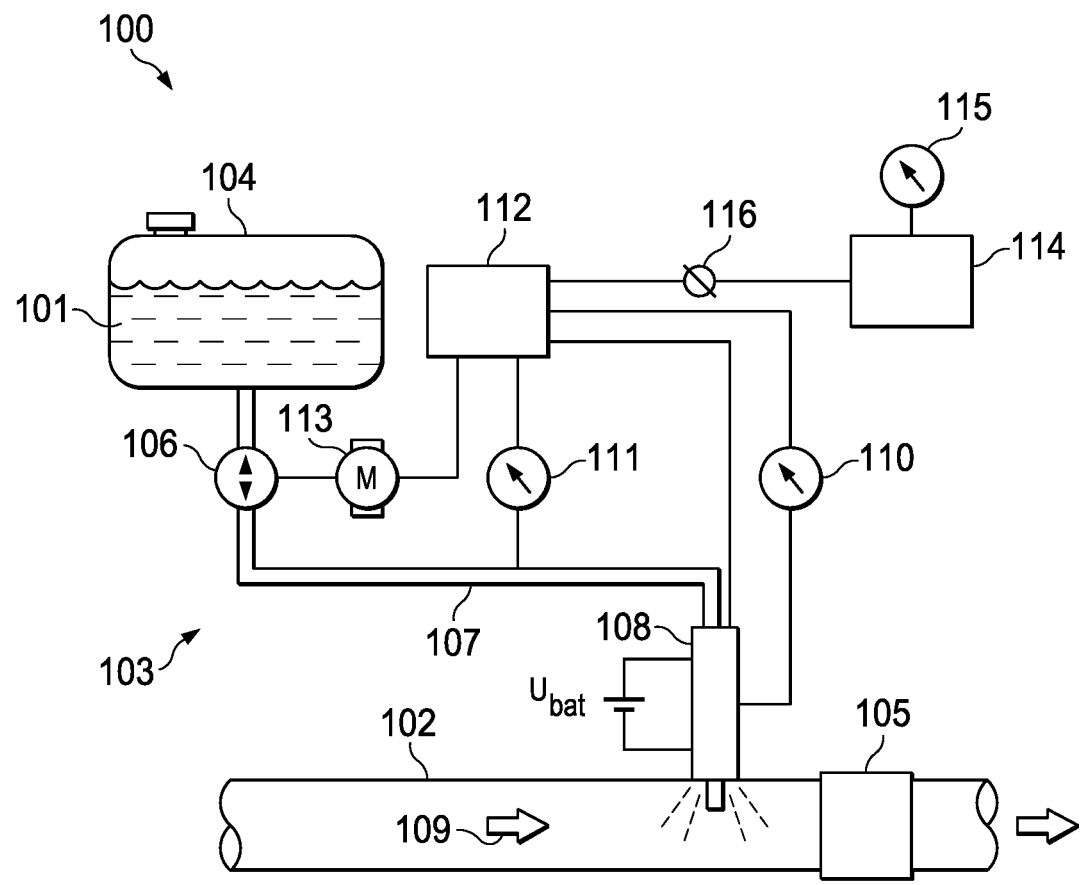
FIG. 1 a diagrammatic depiction of an SCR system for introducing additive into the exhaust system of an internal combustion engine incorporating teachings of the present disclosure.

In the figures, identical or similar components are provided with the same reference signs.

DETAILED DESCRIPTION

In some embodiments, a method for monitoring a pressure sensor in a hydraulic system of a motor vehicle, includes actuating a valve of a pressure accumulator in the hydraulic system. Furthermore, a behavior of the valve in response to the actuation is determined, and from the determined valve behavior a time delay or time offset of the valve is determined. Furthermore, a measurement value of the pressure sensor is determined. The determined time offset is compared with the determined measurement value, and the plausibility of the measurement value is checked by means of the comparison.

In some embodiments, there is a method and a device for monitoring a pressure sensor in a hydraulic system of a motor vehicle. The device comprises a valve, a pressure accumulator and a control unit. The pressure sensor and the valve are both connected to the pressure accumulator, wherein by the system design, the pressure accumulator can be loaded with a pressure. The control unit is connected to the pressure sensor and to the valve and is configured to determine a valve behavior which is sensitive to the momentary system pressure. The control unit here is configured to determine a time delay or time offset of the valve from the determined behavior and check the plausibility of an associated measurement value of the pressure sensor using a comparison between the determined time offset and the measurement value.

In some embodiments, a behavior of the valve, which is dependent on a pressure acting momentarily on the valve, is utilized such that the plausibility of both the function and an emitted pressure value of a pressure sensor in a hydraulic system of a vehicle can be checked in a reliable and simple fashion. In brief, this is possible in particular because a time offset of a valve is considered which can be related to the measurement value of the pressure sensor. The valve behavior concerned, which was selected in particular because of the respective function method of the valve, is here not restricted to a specific type but may rather reflect any arbitrary, suitable, pressure-dependent valve characteristic which can be measured in response to the valve actuation.

Thus, a relationship between the pressure at the valve and the pressure at the pressure sensor, which results in particular from the specific design of the hydraulic system, may be utilized. For example, the pressure at the pressure sensor may correspond to the pressure at the valve, or the pressure values may be linked together via a scaling factor or another relationship. In some embodiments, a circumstance may be utilized, according to which the valve has a reaction time which is dependent on external forces and may result in particular from a pressure acting unilaterally on the valve, such as for example a momentary pressure from the connection side of a hydraulic line.

In some embodiments, an additional information source may be used to derive a conclusion about the pressure sensor, wherein in particular an inertia in the valve behavior, which is dependent on the forces acting on the valve and is caused by the system design, may be utilized. Thus, for example, an existing delay in a movement of a component of the valve, or an effect of the movement, may be observed or measured. This delay may in particular be connected with a time necessary for creating a force balance in the actuated valve.

In some embodiments, in comparison with the prior art, the pressure sensor can be checked and monitored better. In addition, by observing the pressure sensor or other components of the hydraulic system in conjunction with the above-mentioned determination of the valve behavior and the associated time offset of the valve, a more precise conclusion can be drawn about the function of the valve. Thus, to determine a malfunction of the valve or hydraulic system, the determination of the time offset may also comprise determining that the time offset is not observed within a predefined time period or exceeds a predefined time period.

In some embodiments, determination of the behavior comprises determining a temporal development of an electrical parameter of the valve. The time offset may be determined from the determined temporal development. In this way, directly measurable electrical characteristics of the valve, which result from the moving parts of the valve, can be utilized.

In some embodiments, the valve may be configured as a solenoid valve, wherein actuation leads to a movement of a solenoid armature of the valve.

In some embodiments, the actuation may comprise the output of an opening signal for opening the valve, wherein the determined time offset may relate to the temporal difference between a start of an opening movement of the valve and a start of the actuation. This embodiment may be applicable for directly controlled valves which open by actuation of an electromagnet. For example, the time delay or time offset may be detected from a development of a current flowing through the exciter coil in comparison with the development of an actuation signal or an actuation voltage imposed on the exciter coil. The teachings herein are not however restricted to directly controlled valves. In some embodiments, for example, a pressure-controlled valve may also be used. The teachings are not restricted to solenoid valves. For example, according to other embodiments, use on piezo-electric valves is also conceivable.

Furthermore, depending on the valve design and the configuration of the hydraulic system or the actuation of the system, a pressure-dependent closing behavior may also be measured.

The use of a temporal development of a current through the exciter coil allows a particularly simple implementation of the method, in particular since an already existing valve actuation component may be used to determine the time offset. In this way, a particularly high accuracy of the method can be achieved.

In some embodiments, there is a sensor to detect the valve behavior, in particular a suitable type of movement sensor. In some embodiments, it is also conceivable to use other, for example optical, detection methods to determine the valve behavior and time offset.

Briefly or to summarize, a valve—in particular a metering valve or injection valve—may also be used as a type of redundant pressure meter in order to monitor the actual pressure sensor. In some embodiments, the valve may be actuated for a specific predefined duration. The actuation period may be selected suitably such that the valve is operated, in particular opened, initially reliably by the actuation. Furthermore, the duration may simultaneously be selected to be as short as possible.

The actuation and the subsequent evaluation may therefore be repeated several times in a precisely defined fashion, in particular at different times, so as to achieve a further increase in accuracy in determining the valve behavior and time offset.

In some embodiments, an SCR system is used for metering additive, in particular urea, into the exhaust system of an internal combustion engine, wherein the valve is an injector of the SCR system configured as a solenoid valve. The valve actuated according to the method may be a metering valve or an injector of the SCR system. However, the teachings are not restricted to an SCR system of the vehicle.

In some embodiments, a motor vehicle is provided with an internal combustion engine and an SCR system for metering additive into the exhaust system of the internal combustion engine, wherein the SCR system comprises a pressure accumulator for the additive and a pressure sensor and injection valve connected thereto. Furthermore, the SCR system is provided with a control unit which is connected to the SCR system and configured such that the method according to the invention can be implemented.

The teachings may also be applied in conjunction with several valves and/or with several pressure sensors which can be monitored and plausibility-checked. Furthermore, the teachings may be applied particularly in combination with an ambient pressure sensor of the vehicle. The ambient pressure sensor may supply a further pressure measurement as well as measurement of the pressure sensor to be monitored. The ambient pressure sensor may for example be connected to a central control unit (ECU) of the vehicle or be arranged at the central control unit. Based on the determined measurement value of the pressure sensor and a measurement value of the ambient pressure sensor, a pressure difference can then be determined. Furthermore, using the determined pressure difference, an offset of the actuated valve can be adapted or plausibility-checked.

These features may be used to determine or verify a present characteristic curve of the valve, or to adapt an evaluation method of the valve signals if required. Briefly, with such an embodiment, an additional valve calibration and plausibility check may be performed. Furthermore, in this way determination of the valve time offset or time delay may be further optimized and the components of the hydraulic system may be matched to each other more precisely. Furthermore, if during determination of the pressure difference it is established that the pressure difference resulting from the determined measurement values of the pressure sensors exceeds a predefined pressure threshold, a fault may be detected.

In some embodiments, when a fault is detected, the system is set into a safe state and for example switched off. In some embodiments, the fault may be communicated or displayed to the driver.

In some embodiments, a pressure balance may be carried out between the pressure accumulator and an environment of the hydraulic system. A fault may be detected if the time offset after performing the pressure balance is greater than a first predefined threshold, or if the time offset after performing the pressure balance is not measurable. In this way, in a particularly simple fashion, the valve used to monitor the pressure sensor is firstly checked for function capacity.

In some embodiments, the pressure accumulator may be filled in several predefined actuation sessions. In each actuation session, a predefined fluid quantity may be introduced into the pressure accumulator. Furthermore, at least the steps of actuating the pressure sensor, determining a behavior of the actuated valve, determining the time offset of the actuated valve, and determining the measurement value of the pressure sensor, may be carried out for each of the actuation sessions. In this way, the characteristic curve of the pressure sensor can be reliably determined and adapted, and the pressure sensor may therefore be monitored and plausibility-checked more precisely.

In some embodiments, at least one measurement value of the pressure sensor and an associated time offset of the actuated valve are determined and stored for each actuation session. Furthermore, the plausibility of a development of the measurement values of the pressure sensor, which were determined during the respective actuation session, may be checked using the associated time offsets of the actuated valve. In this way, a pressure sensor gradient or an individual amplification factor of the pressure sensor characteristic curve can easily be determined and plausibility-checked.

In some embodiments, a pressure gradient in a respective actuation session is determined from a present and a previous measurement value of the pressure sensor.

In some embodiments, during filling of the pressure accumulator, the system pressure is monitored using the measurement values of the pressure sensor determined in the actuation sessions, wherein the filling of the pressure accumulator is ended as soon as the pressure in the pressure accumulator exceeds a third predefined pressure threshold value and the pressure gradient exceeds a fourth predefined threshold. Furthermore, a fault may be detected and output if a predefined number of actuation sessions for filling the pressure accumulator is exceeded.

In some embodiments, direct diagnosis of a pressure sensor amplification error is not possible without additional sensors. Previously, function monitoring of the SCR system was only possible indirectly, for example by means of indirect plausibility checking of an injected reduction agent quantity based on an efficiency estimate of the respective SCR catalyst which was obtained by comparison of a $NO_x$ concentration before and after the SCR catalyst.

FIG. 1 shows a diagrammatic depiction of components of an injection system or SCR system 100 for metering additive, here urea 101, into the exhaust system or exhaust gas line 102 of an internal combustion engine (not shown). The SCR system 100 has a hydraulic part or hydraulic system 103 with a tank 104 for storing the urea fluid 101. The tank 104 is connected via a pump 106 to a line 107 functioning as a pressure accumulator. The pump 106 is connected to a drive motor 113 and may be operated in both directions. A valve 108 for metering the urea fluid 101 into the exhaust gas line 102 is connected to the line 107.

Downstream of the valve 108, an SCR catalyst 105 is arranged in the exhaust gas line 102 for reducing harmful nitrogen oxides in the exhaust gas stream 109. The valve 108 is here configured as a coil-operated injector or solenoid valve and may be actuated by application of an exciter voltage $U_{bat}$. The valve 108 may be closed by removing the voltage $U_{bat}$. The valve 108 is connected to a current meter 110 for measuring a current $I_{coil}$ through the exciter coil of the valve 108. Furthermore, a pressure sensor 111 is connected to the pressure accumulator 107, i.e. the line 107, as a system pressure sensor of the hydraulic system 103 for measuring the line pressure.

The hydraulic system 103 furthermore has a controller 112 which is connected to the drive motor 113 of the pump 106 and to the pressure sensor 111, the valve 108 and the current meter 110. Furthermore, a central control unit (ECU) 114 and an ambient pressure sensor 115 are arranged in the complete system, here a vehicle. The central control unit 114 and the controller 112 are connected together via a communication interface 116. Although here the hydraulic system 103 has a dedicated controller 112, according to a variant of the embodiment, it is also conceivable for the central control unit 114 to actuate and read the hydraulic system 103 directly. The hydraulic system 103 has the task of introducing a predefined quantity of additive or urea fluid 101 into the exhaust system 102. Then the urea fluid 101 is used to reduce harmful nitrogen oxides in the downstream SCR catalyst 105 in order to observe the legally prescribed emission limits.

In some embodiments, on each system start, the hydraulic system 103—which was evacuated on the preceding system stoppage—or the line 107 and pump chamber is filled with additive 101 and a constant system pressure P is set. The pressure $P_L$ in the line 107 is detected by means of the pressure sensor 111, and the pump 106 is actuated in a closed control loop as required so that during the purging process, when the metering valve 108 is open, the air can escape from the line 107 and when the metering valve 108 is closed, the desired system pressure is set. In this context it is pointed out that the abbreviation $P_L$ used in the description below may, depending on context, refer to the actual line pressure, i.e. the line pressure itself, or to the respective displayed measurement value of the pressure sensor 111. During metering, the continuously operated pressure regulation ensures a constant system pressure P.

The system pressure sensor 111 normally uses an indirect capacitive or piezo-resistive measurement process. Here, using a characteristic curve, the pressure is determined from the measured voltage value $U_{sensor\_meas}$. This characteristic curve of the pressure sensor 111 is defined via an individual amplification factor a and an offset value b:

$$P(U_{sensor\_meas}) = a \cdot U_{sensor\_meas} + b$$

in which a: amplification factor, b: offset, and P: pressure measurement value.

In the present case, the hydraulic system 103 is shown leakage-free for the sake of simplicity, wherein however in the case of an SCR system with leakage, its effect must also be taken into account on the diagnosis of the pressure sensor, in particular in the characteristic curve.

The offset value b and the amplification factor a are subject to ageing influences and component scatter and must therefore be plausibility-checked during operation and corrected if necessary. Both values of the characteristic curve, i.e. the amplification a and the offset value b, must be monitored during operation of the system 103 in order to ensure the correct function of the sensor. To check the plausibility of the offset value b, on system start with the hydraulic system 103 evacuated, firstly a pressure balance is created with the environment by opening the injection valve 108. Then a comparison is made between the pressure measurement value $P_L$ and the measurement value $P_U$ of the ambient pressure sensor 115 present in the vehicle. The ambient pressure sensor 115 is not generally arranged in the hydraulic system 103 but for example at the central control unit 114. Since furthermore it is not possible to monitor the amplification factor a of the line pressure sensor 111 without using a further sensor in the hydraulic system, the valve 108 is used for this.

The plausibility of the measurement value $P_L$ of the pressure sensor 111 must be checked during operation since the system pressure has a direct influence on the quantity of reduction agent or urea fluid injected into the exhaust gas line by the injector 108, and hence on the exhaust gas values of the system.

With the arrangement described above, due to the actuation according to the method, the plausibility of the function of the pressure sensor 111 in the hydraulic part 103 of the SCR system 100 may be checked using the valve 108, and hence using an already existing component which is inherent in the system.

For this, an opening time delay $dt = t_1 - t_0$ of the metering valve 108 is monitored during a filling and pressure build-up process, and by comparison with the present measured pressure value $P_L$, the function of the pressure sensor 111 and also its pressure value $P_L$, in particular the amplification factor a, is plausibility-checked.

Figure 2:
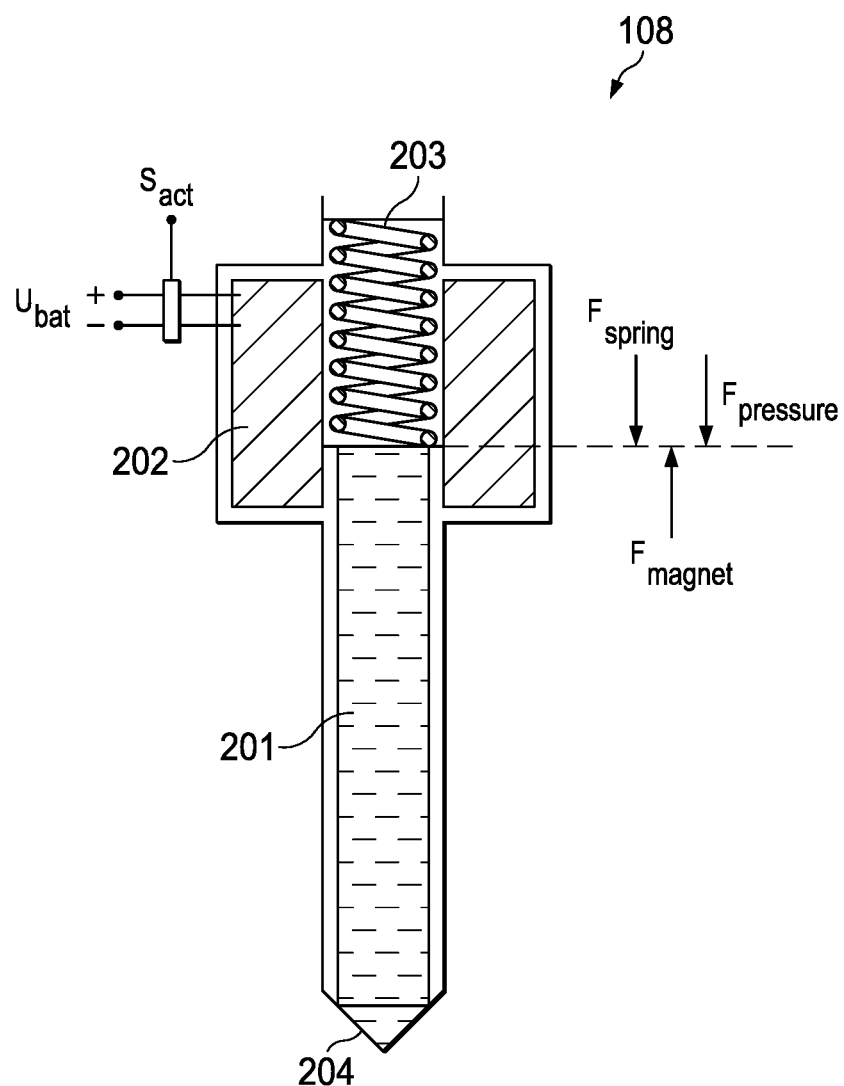
FIG. 2 an enlarged depiction of the metering valve of the SCR system from FIG. 1, FIG. 3 diagrams of the temporal development of a needle position of the metering valve, a coil current, and an actuation signal for actuating the metering valve from FIG. 1 and FIG. 2, FIG. 4 diagrams of a temporal development of a coil current for various exemplary pressure measurement values incorporating teachings of the present disclosure.
Figure 3:
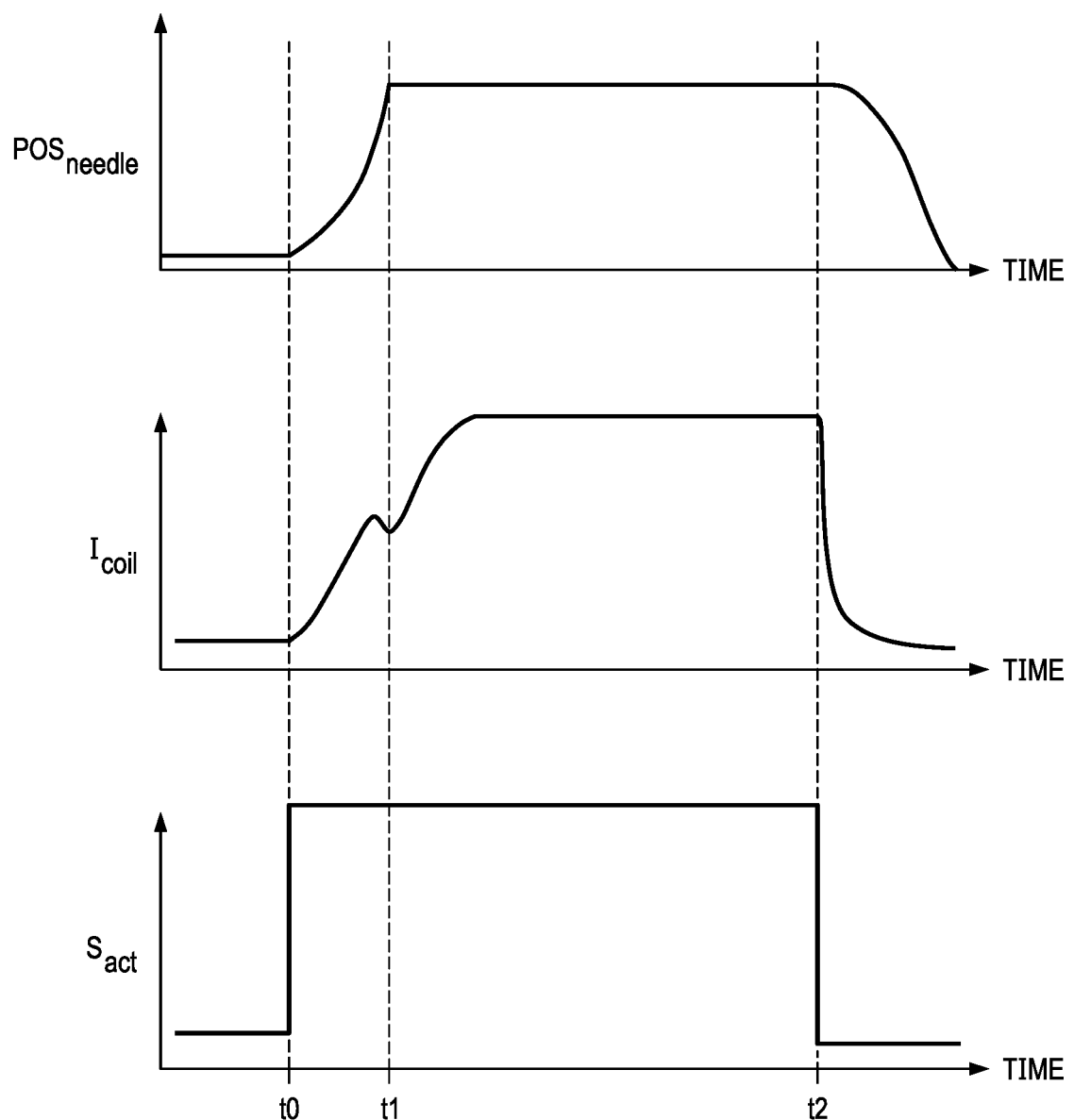

Here, the method and physical principle described below with reference to FIG. 2 and FIG. 3 are used. FIGS. 2 and 3 describe the physical correlations at the metering valve 108 according to an embodiment of the invention. FIG. 2 shows a diagrammatic depiction of the metering valve 108 of the SCR system from FIG. 1 and an overview of the forces acting on the valve needle 201 of the metering valve 108. As FIG. 2 shows, the metering valve 108 is designed as a coil-operated injector 108.

The valve 108 has a spring-loaded valve needle 201 which closes the injection opening 204 of the valve 108 in the non-actuated state. Actuation takes place in particular by application of an actuation signal $S_{act}$, which applies an exciter voltage $U_{bat}$ to the exciter coil 202. Both the force $F_{spring}$ of the spring 203 and the force $F_{pressure}$ resulting from the system pressure P act on the valve 108 in the closing direction. If additive 101 is to be introduced, the voltage $U_{bat}$ is applied to the coil 202 of the valve 108. This voltage $U_{bat}$ causes a current flow $I_{coil}$ through the coil 202 which in turn exerts a force $F_{magnet}$ on the valve needle 201 because of the resulting magnetic field, since the valve needle 201 constitutes the solenoid armature of the coil 202. This force $F_{magnet}$ works in the opening direction.

The following correlation applies:

$$F_{needle} = F_{magnet} - F_{spring} - F_{pressure}$$

$$F_{magnet} \sim I_{coil}$$

If the magnet force $F_{magnet}$ exceeds the sum of the spring force $F_{spring}$ and pressure force $F_{pressure}$, the valve needle 201 is accelerated in the opening direction and clears the injection opening 204 or valve opening 204. To close the valve, the actuation voltage $U_{bat}$ is switched off, whereupon the current flow $I_{coil}$ through the coil 202 is interrupted and the magnetic field diminishes, so that the valve needle 201 closes the valve opening 204.

FIG. 3 shows diagrams of an exemplary temporal development of the actuation signal $S_{act}$ for actuating the metering valve 108, a resulting changing needle position $Pos_{needle}$, and an associated coil current $I_{coil}$. As evident from FIG. 3, the movement of the valve needle 201 in the opening process has a direct influence on the inductance of the system comprising the coil 202 and valve needle 201, and hence on the current $I_{coil}$ flowing through the coil 202. The change in coil current $I_{coil}$ thus correlates directly with the movement of the valve needle 201. The time $t_1$ of start of the change in coil current $I_{coil}$ because of the needle movement, relative to the start time $t_0$ of actuation, is a direct measure of the system pressure or line pressure $P_L$ present at the valve needle 201. The plausibility of the measured pressure $P_L$ in the pressure accumulator 107 is checked using the correlation of the valve opening time $t_1$ to the pressure $P_L$ in the pressure accumulator 107. This is illustrated below with reference to FIG. 4 for various line pressures $P_L$.

Figure 4:
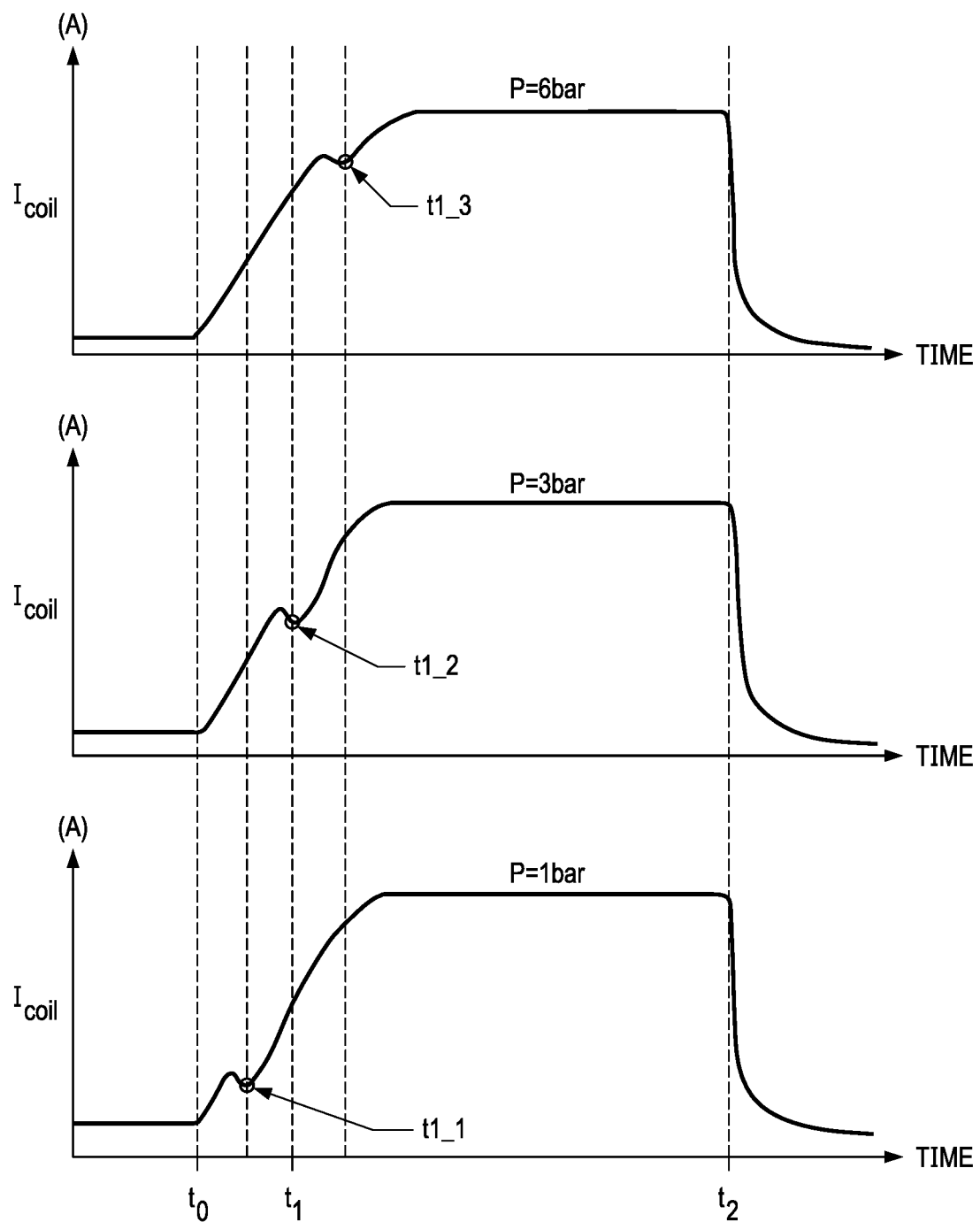

FIG. 4 shows diagrams of the temporal development of the coil current $I_{coil}$ (A) for various line pressures $P_L$. As FIG. 3 shows, the development of the coil current $I_{coil}$ is measured in the presence of different system pressures or line pressures $P_L$ of P=6 bar, P=3 bar and P=1 bar, wherein the other conditions, i.e. the actuation signal $S_{act}$ and the exciter voltage $U_{bat}$, remain unchanged. Since the system pressure $P_L$ is different each time, a different pressure force $F_{pressure}$ acts on the needle 201, so this has a more inert time behavior since the magnet force $F_{magnet}$ needs longer to balance the sum of the spring force $F_{spring}$ and the pressure force $F_{pressure}$. This is perceptible from the different length of the time delay or time offset $t_{1\_n} - t_0$.

The plausibility of the respective measured pressure $P_L$, here P=6 bar, P=3 bar and P=1 bar, in the pressure accumulator 107 is checked using the correlation of the respective valve opening time $t_{1\_n}$ to the respective associated pressure measurement value of the pressure $P_L$ in the pressure accumulator 107. Thus, as already stated, $t_{1\_n} - t_0$ is a direct measure of the system pressure $P_L$ present at the valve needle 201.

Figure 5:
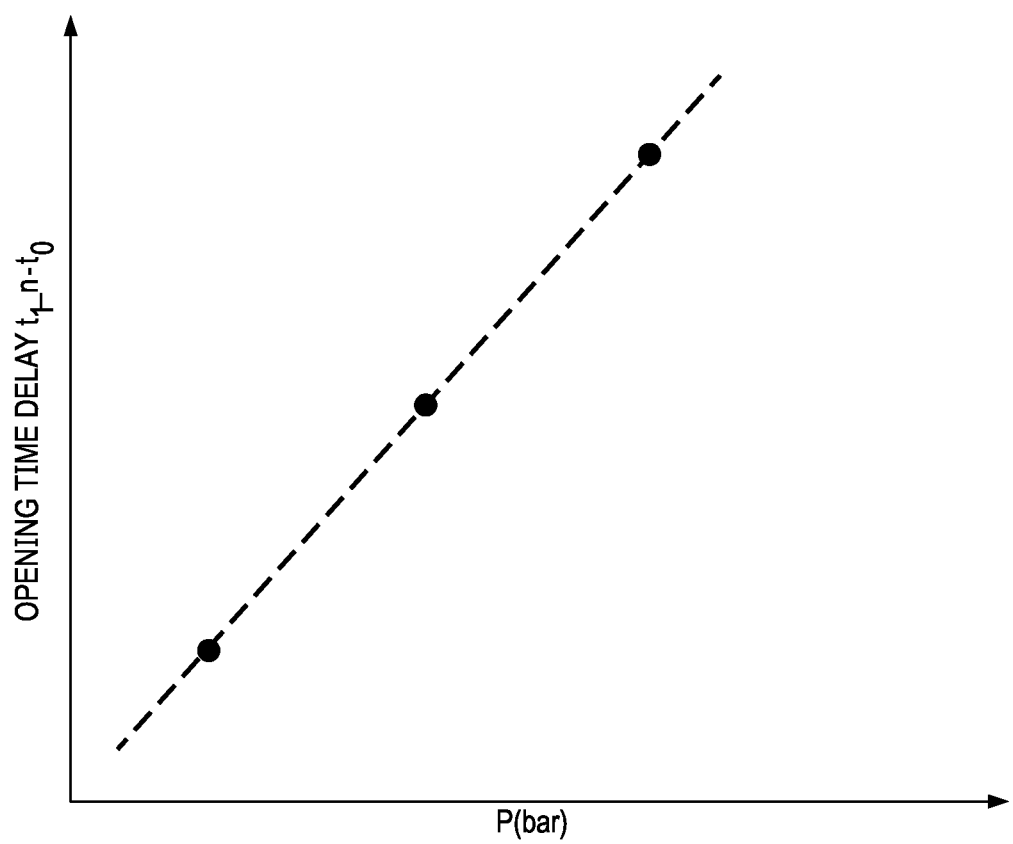
FIG. 5 a diagram of exemplary values of time offsets determined according to the method, shown over the respective associated pressure measurement value, incorporating teachings of the present disclosure.

FIG. 5 shows a diagram of the determined opening time delay $t_{1\_n} - t_0$ over the pressure P (bar). As evident from FIG. 5, in the embodiment shown here, a linear correlation exists.

Figure 6:
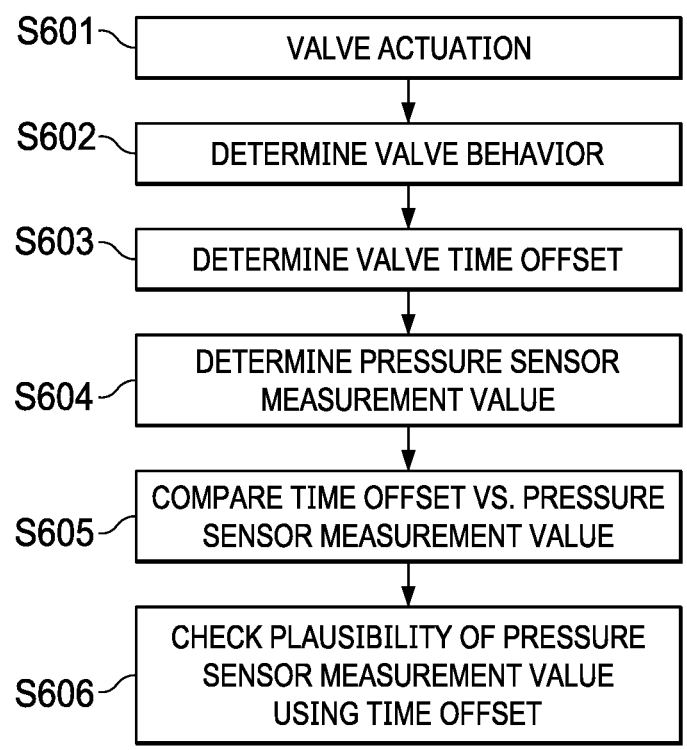
FIG. 6 steps of a method for monitoring a pressure sensor in a hydraulic system of a motor vehicle incorporating teachings of the present disclosure.

FIG. 6 shows steps of a method for monitoring a pressure sensor 111 in a hydraulic system 103 of a motor vehicle according to one embodiment of the invention. In a step S601, the valve 108 of the pressure accumulator 107 in a hydraulic system 100 of the motor vehicle is actuated. In step S602, a behavior of the actuated valve 108 in response to the actuation is determined. In step S603, a time offset dt of the actuated valve 108 is determined from the determined behavior. In step S604, a measurement value $P_L$ of the pressure sensor 111 is determined. In step S605, the time offset dt of the valve 108 is compared with the determined measurement value $P_L$. Finally, in step S606, the plausibility of the measurement value $P_L$ is checked using the comparison made.

Figure 7:
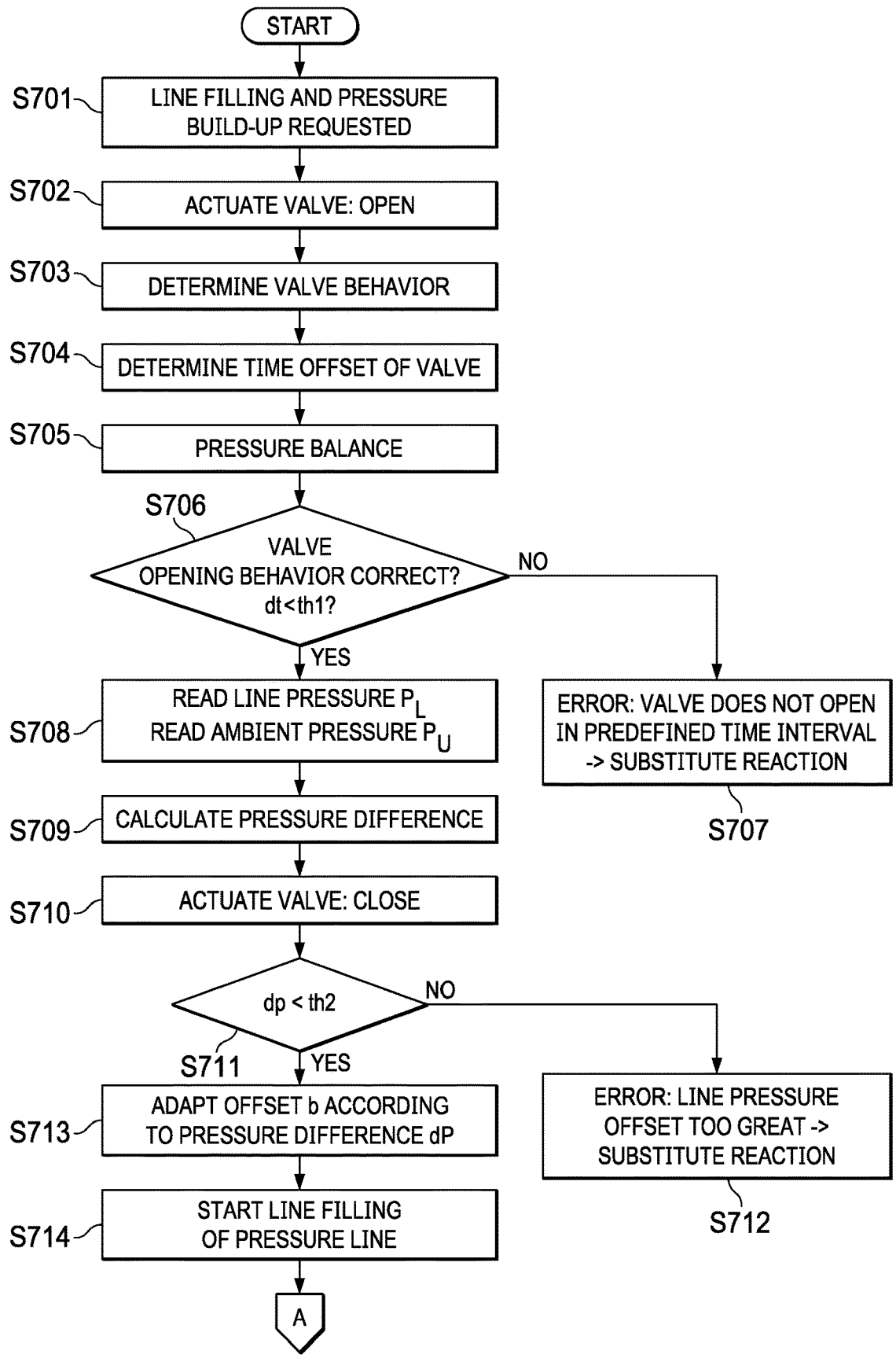
FIG. 7 steps of an offset diagnosis of a pressure sensor in an SCR system incorporating teachings of the present disclosure.
Figure 8:
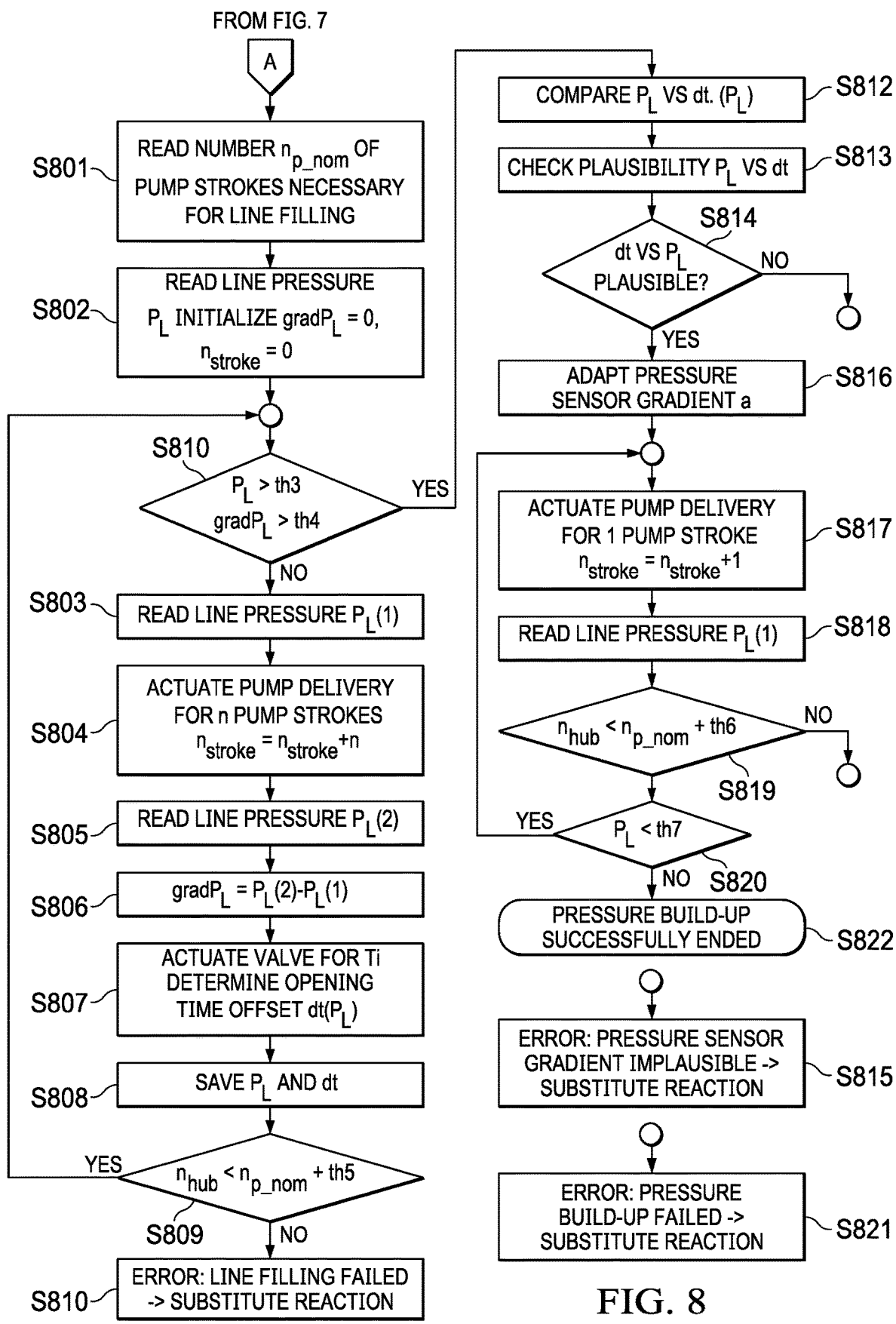
FIG. 8 steps of line filling and for pressure build-up in an SCR system incorporating teachings of the present disclosure.

FIGS. 7 and 8 show the individual steps of the method for plausibility checking or diagnosing the line pressure sensor 111 during the process of filling and building up pressure in the hydraulic SCR system 100 according to one embodiment of the invention. For the purpose of comparison, the components cited in the description below continue to be designated with the reference signs introduced in FIG. 1.

FIG. 7 shows the steps of an offset diagnosis of a pressure sensor 111 in an SCR system 100. In a first part of the method shown in FIG. 6, firstly the offset value b of the line pressure sensor 111 is plausibility-checked. In step S701, in particular via the interface 116, an SCR line filling and pressure build-up are requested, whereupon the controller 112 actuates the hydraulic part 103 of the system 100 according to the method. Initially, a pressure balance is created between the unfilled hydraulic system 103 and the environment, as will be described in more detail below. After each system stop, the SCR system 100 is evacuated as standard in order to prevent damage from ice pressure during a freezing process. The process of system filling, which is advantageous for diagnosis of the pressure sensor 111, is requested on each start of the system 100. This ensures that the diagnosis has already been performed before the introduction of additive 101 and a potential fault can be detected.

In step S702, the injector, i.e. the valve 108, is actuated to open. Then in step S703, a behavior of the actuated valve 108 is determined in that an injector current curve, i.e. a development of the coil current $I_{coil}$, is determined. In step S704, a time offset $t_{1\_n} - t_0$ of the actuated valve 108 is determined from consideration of the injector current curve.

In step S705, a pressure balance is carried out between the pressure accumulator, i.e. the line 107, and an environment of the hydraulic system 103, by waiting until the line pressure and ambient pressure have balanced.

In step S706, the current curve $I_{coil}$ or the time offset $t_1 - t_0$ is evaluated and analysed with regard to system configuration, and hence the valve 108 is checked for a correct opening behavior. This may be carried out in parallel with step S705. If it is established here that opening cannot be detected from the coil current $I_{coil}$, and the duration of the determined time offset $dt = t_1 - t_0$ exceeds a first predefined threshold th1, in step S707 a corresponding fault is detected and the corresponding substitute reaction triggered, since the injector—i.e. the valve 108—is not opening within the predefined time interval. Then the line pressure measurement value $P_L$ is compared with the total system, i.e. the measurement value $P_U$ of the ambient pressure sensor 115 present in the vehicle, in order to check the plausibility of the offset b of the line pressure sensor 111 and correct this if necessary. For this, if the detected time offset does not exceed the first predefined threshold th1, in step S708 the pressure sensor 111 for line pressure 107 and the ambient pressure sensor 115 are read. In step S709, the difference dP between the measurement value $P_L$ of the pressure sensor 111 and the measurement value $P_U$ of the ambient pressure sensor 115 is formed:

$$dP=P_L-P_U$$

In step S710, the valve 108 is actuated to close. In step S711 it is checked whether the pressure difference dP is smaller than a second predefined pressure threshold th2. If this is not the case, in step S712 an error is detected or output, indicating that the offset b of the line pressure is too great, and a corresponding substitute reaction is triggered. If however there is no error in the valve 108 nor an implausible offset value b of the line pressure sensor 111, in step S713 the offset value b may be adapted according to the determined pressure difference dP, and line filling may be started in step S714. The further steps for line filling are described in more detail below with reference to FIG. 7.

FIG. 8 shows steps for line filling and pressure build-up in an SCR system 100 according to one embodiment of the invention. For this, in step 801, firstly a number $n_{p\_nom}$ of adapted necessary pump delivery cycles is read from a non-volatile memory of the controller 112, and in step 802 the line pressure $P_L$ is read, and the number $n_{stroke}$ of delivery cycles carried out and the line pressure gradient $gradP_L$ are initialised to the values $n_{stroke}=0$ and $gradP_L=0$.

In the iteration loop which follows, successively the air is expelled from the pressure line 107 by pump delivery of additive 101, and the measurement values $P_L$ are determined for the plausibility check of the pressure sensor amplification factor a. In the first iteration step S803, the line pressure $P_L(1)$ is measured. In step S804, the pump 106 is operated for a number (which can be set by calibration) of n pump strokes, whereby the number $n_{stroke}$ of stored delivery cycles is increased to $n_{stroke}=n_{stroke}+n$. In steps S805 to S806, the resulting pressure $P_L(2)$ or pressure gradient $gradP_L=P_L(2)-P_L(1)$ is determined. In step S807, the valve 108 is actuated for a predefined time $T_i$, for example 5 ms, i.e. the actuation voltage $U_{bat}$ is applied to the coil 202 for time $T_i$ so that firstly the compressed air can escape from the line 107 and secondly the opening time delay $dt=t_{n\_1}-t_0$ of the valve 108 can be determined from analysis of the current curve $I_{coil}$. Then in step S808, the opening time delay $dt=t_{n\_1}-t_0$ as a function of the line pressure $P_L$ is stored for later analysis.

The loop has two interrupt conditions: In step S809, it is checked whether a maximal number of pump strokes $n_{max}=n_{p\_norm}+th5$, wherein th5 is a predefined threshold, has been exceeded without a pressure threshold th3 and/or a pressure gradient threshold th4 being exceeded. If this is the case, according to step S810 a fault is present in the hydraulic system 103 and corresponding substitute reactions are initiated.

The iteration of the loop S803 to S809 with S810 corresponds to the performance of a number of actuation sessions, wherein each run of the loop corresponds to one actuation session, with regard to which the basic steps according to FIG. 6 may be applied.

Normally, the iterative fill/purge cycles in steps S803 to S809 lead to air escaping from the system 103, whereby the stiffness of the system 103 increases. Accordingly, a subsequent pump delivery cycle, which delivers a pressure-independent quantity of additive into the line, leads to a pressure rise. The amount of the pressure rise per pump delivery, i.e. the calculated pressure gradient $gradP_L$, is therefore an indicator of the residual air content in the line 107. If a threshold (which can be set by calibration) for pressure and pressure rise has been exceeded in the preceding iteration cycle, according to step S810 the purging of the line 107 is successfully ended and the method continues with step S811.

In steps S812 to S813, the plausibility of the pressure sensor measurement values recorded during the line purge is checked by comparison of the measurement values for pressure and opening time delay of valve 108. In the case of an established implausible behavior, in steps S814 and S815, a corresponding error is detected and substitute reactions performed or initiated.

To increase the accuracy of the method, it is proposed to learn the injector-dependency of the method in the new state of the system, i.e. to carry out an "end of line" adaptation of the diagnosis. If, in the case of a plausible behavior in step S814, the plausibility of the pressure sensor 111 was confirmed, then in step 816 the gradient a of the characteristic curve of the pressure sensor 111 may be adapted if required. Then the pressure builds up to the system internal pressure. For this, in step S817, individual pump delivery strokes are requested so that the number of pump delivery strokes in the memory is increased to $n_{stroke}=n_{stroke}+1$. During this, the line pressure $P_L$ is monitored in S818. In step S819, a condition $n_{stroke}<n_{p\_norm}+th6$ is checked, wherein th6 is a predefined threshold. If during pressure build-up the number of pump strokes exceeds the threshold th6 (which can be set by calibration), a fault is present in the system and a corresponding substitute reaction is carried out, see step S821. In step S820 it is checked whether the pressure $P_L$ exceeds an applicable threshold th7. If this is the case within a predefined number of pump strokes, the pressure build-up in steps S817 to S820 was successful and the method is terminated in step S822.

LIST OF REFERENCE SIGNS

100 SCR system
101 Urea
102 Exhaust gas line
103 Hydraulic system
104 Tank
105 SCR catalytic converter
106 Pump
107 Line
108 Valve
109 Exhaust gas stream
110 Current meter
111 Pressure sensor
112 Controller
113 Drive motor
114 Central control unit (ECU)
115 Ambient pressure sensor
116 Communication interface
201 Valve needle
202 Exciter coil
203 Spring
204 Injection opening
S601-S606 Steps
S701-S714 Steps
S801-S822 Steps

What is claimed is:
1. A method for monitoring a pressure sensor in a hydraulic system of a motor vehicle, the method comprising:
actuating a valve of a pressure accumulator in the hydraulic system;

detecting a behavior of the actuated valve in response to the actuation;

determining a time offset of the actuated valve based on the detected behaviour;

determining a measurement value of the pressure sensor;

comparing the time offset of the valve with the determined measurement value;

checking a plausibility of the measurement value based on the comparison;

wherein detecting the behaviour comprises determination of a temporal development of an electrical parameter of the valve; and determining the time offset is based on the determined temporal development.

2. The method as claimed in claim 1, wherein:

actuating the valve comprises sending an actuation signal for opening the valve; and the determined time offset corresponds to a temporal difference between a start of an opening movement of the valve and a start of the actuation.

3. The method as claimed in claim 1, wherein:

the valve comprises a solenoid valve;

actuating the valve include moving a solenoid armature of the valve; and determining the time offset depends at least in part on a temporal development of a current flowing through an exciter coil of the valve.

4. The method as claimed in claim 1, wherein the valve is actuated for a predefined duration.

5. The method as claimed in claim 1, further comprising:

balancing a pressure between the pressure accumulator and an environment of the hydraulic system; and generating an error signal if the time offset after performance of the pressure balance is greater than a first predefined threshold or is not measurable.

6. The method as claimed in claim 1, further comprising:

calculating a pressure difference based on the determined measurement value of the pressure sensor and a measurement value of an ambient pressure sensor;

wherein the ambient pressure sensor is connected to a central control unit of the vehicle; and adapting an offset of the valve using the determined pressure difference if the pressure difference does not exceed a second predefined pressure threshold, otherwise generating an error signal.

7. A method for monitoring a pressure sensor in a hydraulic system of a motor vehicle, the method comprising:

actuating a valve of a pressure accumulator in the hydraulic system;

detecting a behavior of the actuated valve in response to the actuation;

determining a time offset of the actuated valve based on the detected behaviour;

determining a measurement value of the pressure sensor;

comparing the time offset of the valve with the determined measurement value;

checking a plausibility of the measurement value based on the comparison; and filling the pressure accumulator by actuating the hydraulic system in several predefined actuation sessions;

wherein, in each actuation session, a predefined fluid quantity is introduced into the pressure accumulator.

8. The method as claimed in claim 7, further comprising performing a plausibility check of the measurement values of the pressure sensor using the associated time offsets of the actuated valve determined in the actuation sessions.

9. The method as claimed in claim 7, further comprising determining a pressure gradient in an actuation session from a respective present measurement value and a previous measurement value of the pressure sensor.

10. The method as claimed in claim 9, further comprising:

monitoring the system pressure based on the measurement values of the pressure sensor determined in the actuation sessions;

ending the filling of the pressure accumulator if the pressure in the pressure accumulator exceeds a third predefined pressure threshold value and the pressure gradient exceeds a fourth predefined threshold; and generating an error signal if a predefined number of actuation sessions or pump strokes for filling the pressure accumulator is exceeded.

11. A device for monitoring a pressure sensor in a hydraulic system of a motor vehicle, the device comprising:

a valve;

a pressure accumulator connected to the pressure sensor and the valve, the pressure accumulator configured to be loaded with a system pressure; and a control unit connected to the pressure sensor and the valve, the control unit programmed to:

determine a behavior of the valve based on a momentary system pressure; and based on the determined behavior, determine a time offset of the valve for a plausibility check of an associated measurement value of the pressure sensor using a comparison of the determined time offset and the measurement value.

12. The device as claimed in claim 11, wherein:

the hydraulic system comprises part of an SCR system for introducing urea into the exhaust system of an internal combustion engine; and the valve comprises an injector of the SCR system including a solenoid valve.

13. A motor vehicle comprising:

an internal combustion engine; and an SCR system for introducing urea into an exhaust system of the internal combustion engine;

wherein the SCR system comprises a pressure accumulator for the additive, a pressure sensor, an injection valve, and a control unit which is connected to the SCR system and programmed to:

determine a behavior of the valve based on a momentary system pressure; and based on the determined behavior, determine a time offset of the valve for a plausibility check of an associated measurement value of the pressure sensor using a comparison of the determined time offset and the measurement value.

* * * * *